July 12, 1949.                C. W. HEWLETT                2,476,042
              SELENIUM RECTIFIER AND PROCESS OF FABRICATION
                          Filed Dec. 26, 1946
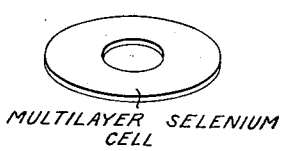
MULTILAYER SELENIUM CELL
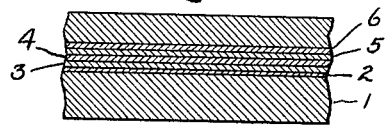
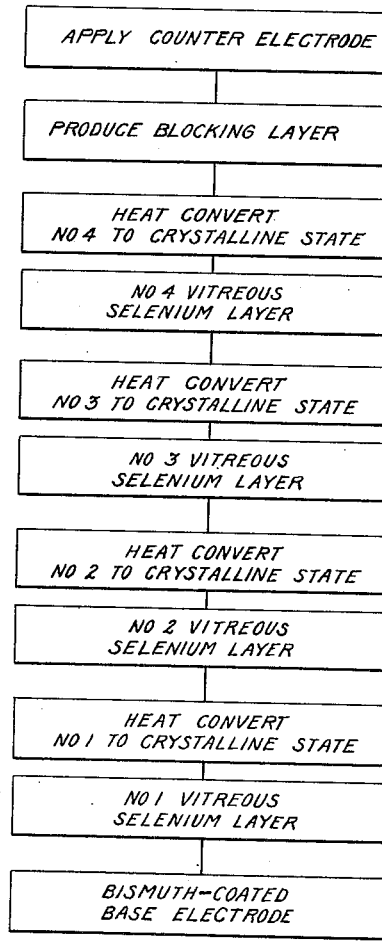
Fig. 3.
Inventor:
Clarence W. Hewlett,
by Harry E. Dunham
His Attorney.

Patented July 12, 1949

2,476,042

UNITED STATES PATENT OFFICE 2,476,042

SELENIUM RECTIFIER AND PROCESS OF FABRICATION

Clarence W. Hewlett, Marblehead, Mass., assignor to General Electric Company, a corporation of New York Application December 26, 1946, Serial No. 718,545

6 Claims. (Cl. 175—366)

The present invention relates to selenium rectifiers and provides improved rectifiers which are capable of rectifying alternating currents of higher voltages than could be rectified by selenium rectifiers of conventional construction.

As will hereinafter be explained more fully, the present improved rectifiers are of multilayer construction comprising successive superimposed strata of selenium which are successively deposited and individually heat-treated.

As a consequence of my present invention, rectifier units are produced which are capable of rectifying alternating current of at least about three-fold higher voltage than conventional prior units. This improvement is obtained without proportionate increase of thickness or weight of selenium per unit area of rectifying surface. The thickness of selenium in such improved rectifiers is only about twenty per cent greater than the thickness of selenium in conventional rectifiers as heretofore made. The forward resistance of the improved rectifier is not increased in proportion to the number of layers of selenium layers which are present. Their resistance is only 10 to 15% higher than the resistance of selenium cells formerly produced. In view of the 300% improvement in rectifying characteristic, this relatively small increase of resistance is not a serious disadvantage.

The accompanying drawing, Fig. 1, shows in perspective one form of selenium rectifier cell; Fig. 2 shows in cross-section the multilayer construction of such a unit; and Fig. 3 indicates diagrammatically the succession of steps employed in the fabrication of such units.

In carrying out the fabrication of rectifiers in accordance with my present invention these advantages are obtained by depositing successive layers of vitreous selenium on a conductive base. Each layer of vitreous selenium is converted in turn at an elevated temperature in the presence of oxygen (air) to the crystalline state before the next succeeding layer is deposited.

The above deposition of vitreous selenium and the subsequent conversion to crystalline selenium in the presence of air is repeated a number of times. Ordinarily four layers of selenium are deposited. The multilayer selenium unit thus obtained is provided by conventional methods with a final blocking layer surface and a superimposed counter-electrode.

In carrying out the fabrication of selenium rectifier cells in accordance with my invention, suitable base blanks of aluminum, iron, nickel, or other suitable metal are coated with selenium. Such blanks may have a shape and area adapted to the type of rectifier to be constructed, a typical form being shown in Fig. 1. The chosen blanks, before deposition of the selenium, are surface-cleaned in accordance with conventional methods which include sandblasting and degreasing by a suitable solvent. Each of these base blanks then is mounted in a spherical evaporator such, for example, as described in my prior Patent 2,354,521, patented July 25, 1944. As a preliminary step, preferably the aluminum base 1 has a thin layer of bismuth 2, Fig. 2, deposited thereon. Selenium thereupon is caused to be deposited from the vapor state on the bismuth-coated surface of the blanks as indicated diagrammatically in Fig. 3. In carrying out these steps, the evaporator sphere is heated to about 100° C. It is then evacuated and the sphere, with its contents of bismuth-coated base blanks, is cooled to a temperature of about 30 to 80° C., the chosen temperatures depending on the geometric proportions of the apparatus and the elements being treated. A typical temperature of 65° C. is satisfactory for an evaporator sphere of about 27 inches diameter made of $\frac{1}{16}$" thick iron.

A selenium film is caused to be evaporated by heating the vaporizing chamber of the apparatus described in Patent 2,354,521. The lowermost film is indicated at 3, Fig. 2. It is preferable to load the vaporizing chamber with exactly the required amount of selenium so that when all the selenium has evaporated, the layer of selenium condensed on the base elements should have a thickness of about 0.5 to 0.6 mil.

Either pure selenium or selenium containing a small amount of halogen, e. g., 0.1 to 0.025 atomic per cent chlorine, may be used in the preparation of selenium cells embodying my invention. Preferably, pure selenium is employed for the deposition of the topmost layer. If the first layer consisting of selenium contains 0.1 atomic % chlorine, the second layer 4 about 0.05% chlorine, and the third layer 5 about 0.025% chlorine, the top layer 6 being chemically pure selenium, a cell of especially stable forward resistance is the result.

The evaporator sphere and its contents then are placed in an oven containing atmospheric air. As the evaporator sphere is not sealed, the heated oven air comes into contact with the selenium-coated elements. The oven is heated to about 216 to 218° C., the temperature being held within these limits for about 45 minutes. This step of the process, as indicated in Fig. 3, converts the vitreous selenium layer into a crystalline form.

During this conversion the exposed surface of the selenium appears to be partially oxidized which confers upon the film a moderate rectifying characteristic. As an illustrative example, it may be said that such a film with such natural oxide coating, if used as a rectifier, could produce a D. C. output of about 10 volts per element.

Each of the crystalline layers of selenium unavoidably contains minute imperfections or pores. The heat treatment of a superimposed vitreous layer causes the vitreous selenium to flow slightly, thus covering minute imperfections in the underlying selenium layer. With the deposition of successive superimposed layers, no continuous holes or channels can exist through the composite selenium cell, that is, between the base plate and the counterelectrode. As a result, higher voltages can be rectified without breakdown.

As each intermediate heat treatment for successive layers of selenium is carried out in the presence of air, it results in each case in some oxidation of the selenium. As the oxidized selenium layers each have a rectifying characteristic and as all these separate layers are present in series in the finished rectifier elements, a high rectification characteristic results without, however, a corresponding increase in resistivity. The process above described preferably is repeated to produce a desired number of selinium layers, the successive steps being diagrammatically indicated in Fig. 3.

Rapid heating and cooling of the selenium units are facilitated by subjecting the selenium units, after the deposition of the topmost layer 6, to thermal treatment in trays instead of attempting to heat and cool a large mass as represented by the evaporator spheres.

The final heat treatment following the evaporation of the last selenium layer is more critical than the others from the standpoint of achieving high reverse resistance for rectification. It is advisable to raise the temperature to its final value as rapidly as possible, that is, in a period of 1 to 2 minutes. Rapid heating results in a fine-grained structure and long tortuous paths along grain boundaries through which the flow of undesired reverse current is held to a minimum in the completed rectifier.

A blocking layer is produced by appropriate chemical treatment, as described, for example, in my prior Patent 2,349,622 of May 23, 1944.

A cooperating counter-electrode 7 finally is applied as by spraying the cells with a suitable metal or alloy as well understood.

Finally the selenium cells are "formed" by passage of suitable current. Although any known approved forming process may be employed, I prefer to apply current to the cells by supporting them between metal plates at least one of which (preferably the anode) is heated to a temperature of about 70 to 80° C. The heat is supplied to the electrode by circulation of hot water through pipes soldered to the electrodes, and the supply of hot water is sufficiently rapid to maintain the cells at a temperature no more than about 2 to 5° above the temperature of the heated terminal in spite of the heat being supplied by joule heat loss in the cell by the forming current.

Preferably direct current is employed for forming although alternating current, pulsating current or other approved known forming currents may be used. A suitable resistance, such as an incandescent lamp, is connected in series with the cells during forming. When forming with 120 to 130 volts a 15 watt tungsten lamp as a series resistance for cells of 1 square inch area may be used. Forming is continued for 5 to 20 minutes, the current through the cells decreasing and the voltage rising during forming. When the voltage across the cells has risen to about 100 to 115 volts, the forming process is discontinued.

The selenium cells finally may be assembled as full wave rectifiers and operated for one to two hours at normal current load and under 15 to 20% excess reverse voltage to stabilize their characteristics.

Selenium rectifier cells of the multilayer type which embody my invention can be used to successfully and continuously rectify alternating current having a root mean square (R. M. S.) voltage as high as 60 volts per cell. This three-fold increase of rectifying characteristic is obtained with little accompanying increase in weight of selenium per unit area. A conventional selenium cell has about 20 milligrams of selenium per square centimeter of surface.

Conventional cells have an average thickness of 0.0043 cm. (0.0017"). The present improved cells have an average thickness of 0.005 cm. (0.0020").

What I claim as new and desire to secure by Letters Patent of the United States is:

1. A selenium rectifier cell which is capable of rectifying alternating current in excess of about 50 volts which consists of a base electrode, a plurality of selenium films superimposed thereon by deposition in vitreous form and intermediate conversion by heat treatment to crystalline form, each said film having a thickness of about one-half mil and the intermediate films being sufficiently surface-oxidized to have individually a rectifying characteristic of about ten volts, the uppermost film being provided with a blocking layer and having a higher rectifying characteristic, and a counterelectrode applied upon said latter film.

2. The method of fabricating a multilayer selenium cell which consists in superimposing a layer of vitreous selenium upon a base electrode, heating said selenium layer in the presence of air to about 216° C. for about 45 minutes to convert said selenium to a crystalline state, cooling said layer, repeating said deposition and heat treatment at least three times, the final heating occurring during a period of about one to two minutes, producing a blocking layer on the topmost film, and finally applying a counterelectrode upon the blocking layer.

3. The method of fabricating a multilayer selenium cell which consists in depositing a layer of about one-half mil thickness of vitreous selenium on a base electrode, heating said selenium-coated base electrode to about 216-218° C. for about 45 minutes in the presence of air, cooling the same to room temperature, repeating the aforesaid step three times, the final heating occurring during a period of about one to two minutes, producing a blocking layer on the uppermost exposed surface, and applying a counter-electrode upon the blocking layer.

4. A selenium cell comprising the combination of a base electrode, a plurality of partially surface-oxidized films of selenium superimposed one upon another on said base electrode by deposition in vitreous form and intermediate conversion by heat treatment to crystalline form, each said film separately having a rectifying characteristic resulting from said conversion and heat treatment and flowing in said heat treatment to provide at said film a substantially uniform reverse voltage characteristic, a current blocking layer on the uppermost film, and a counter-electrode superimposed on said current blocking layer.

5. A selenium rectifier cell comprising the combination of a base electrode, a plurality of partially surface-oxidized films of crystalline selenium superimposed on said base electrode by vapor deposition in vitreous form and intermediate conversion by heat treatment to crystalline form, each successive partially oxidized film having a slight halogen content less than that of the preceding film, a more completely oxidized film of pure selenium superimposed on said partially oxidized films, and a counter-electrode contacting with said latter film.

6. The method of fabricating a selenium cell having a base electrode which consists in successively depositing upon said base electrode and upon each other a plurality of superimposed films of vitreous selenium having a slight halogen content, decreasing the halogen content of each successive film to zero at the uppermost film, converting each said film prior to the deposition of the next succeeding film to the crystalline state by heating in the presence of air, oxidizing the final layer to produce a blocking characteristic, and finally applying a counter-electrode.

CLARENCE W. HEWLETT.

REFERENCES CITED

The following references are of record in the file of this patent:

UNITED STATES PATENTS

| Number | Name | Date |
|---|---|---|
| 2,221,596 | Lorenz | Nov. 12, 1940 |
| 2,426,377 | Smith | Aug. 26, 1947 |